(12) United States Patent
Ooi

(10) Patent No.: US 9,043,824 B2
(45) Date of Patent: May 26, 2015

(54) BROADCAST TRANSMITTER, A BROADCAST TRANSMITTING METHOD AND A BROADCAST RECEIVING METHOD

(75) Inventor: Shinichi Ooi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 87 days.

(21) Appl. No.: 13/489,382

(22) Filed: Jun. 5, 2012

(65) Prior Publication Data

US 2013/0007797 A1 Jan. 3, 2013

Related U.S. Application Data

(63) Continuation of application No. 13/044,354, filed on Mar. 9, 2011, now abandoned.

(30) Foreign Application Priority Data

May 11, 2010 (JP) .................................. 2010-109235

(51) Int. Cl.
| | |
|---|---|
| H04N 7/16 | (2011.01) |
| H04H 60/33 | (2008.01) |
| H04N 7/173 | (2011.01) |
| H04H 60/15 | (2008.01) |
| H04H 60/17 | (2008.01) |
| H04N 21/266 | (2011.01) |
| H04N 21/4623 | (2011.01) |

(52) U.S. Cl.
CPC ............... *H04H 60/15* (2013.01); *H04H 60/17* (2013.01); *H04N 21/26606* (2013.01); *H04N 21/4623* (2013.01)

(58) Field of Classification Search
CPC ..................... H04N 21/4623; H04N 21/26606
USPC ................ 725/1–5, 9, 25, 27, 28, 30, 31, 50, 725/86–87, 104
See application file for complete search history.

(56) References Cited

U.S. PATENT DOCUMENTS

| | | | |
|---|---|---|---|
| 2007/0124753 A1* | 5/2007 | Yamaguchi et al. | 725/8 |
| 2007/0261076 A1* | 11/2007 | Puputti | 725/25 |
| 2008/0046914 A1* | 2/2008 | Gummadi | 725/25 |

FOREIGN PATENT DOCUMENTS

| | | |
|---|---|---|
| JP | 03-280685 A | 12/1991 |
| JP | 04-326827 A | 11/1992 |
| JP | 2000-307449 | 11/2000 |
| JP | 2003-512785 | 4/2003 |
| JP | 2003-274385 | 9/2003 |
| JP | 2008-177849 | 7/2008 |
| WO | WO-01/30082 | 4/2001 |

OTHER PUBLICATIONS

Office Action mailed Apr. 26, 2011, in Japanese counterpart Application No. 2010-109235 and translation, 6 pages.

* cited by examiner

*Primary Examiner* — Pankaj Kumar
*Assistant Examiner* — Alazar Tilahun
(74) *Attorney, Agent, or Firm* — Patterson & Sheridan, LLP

(57) ABSTRACT

In one embodiment, a broadcast transmitter includes: a viewer information memory configured to store viewer information regarding a viewer who signs up for a subscription; a generator configured to generate individual information regarding a conditional access of a content including a first expiration time indicating an expiration time of the individual information and a second expiration time set independently of the first expiration time for each the viewer who signs up for the subscription based on the viewer information; and a transmitter configured to transmit a broadcast signal including the generated individual information.

6 Claims, 9 Drawing Sheets

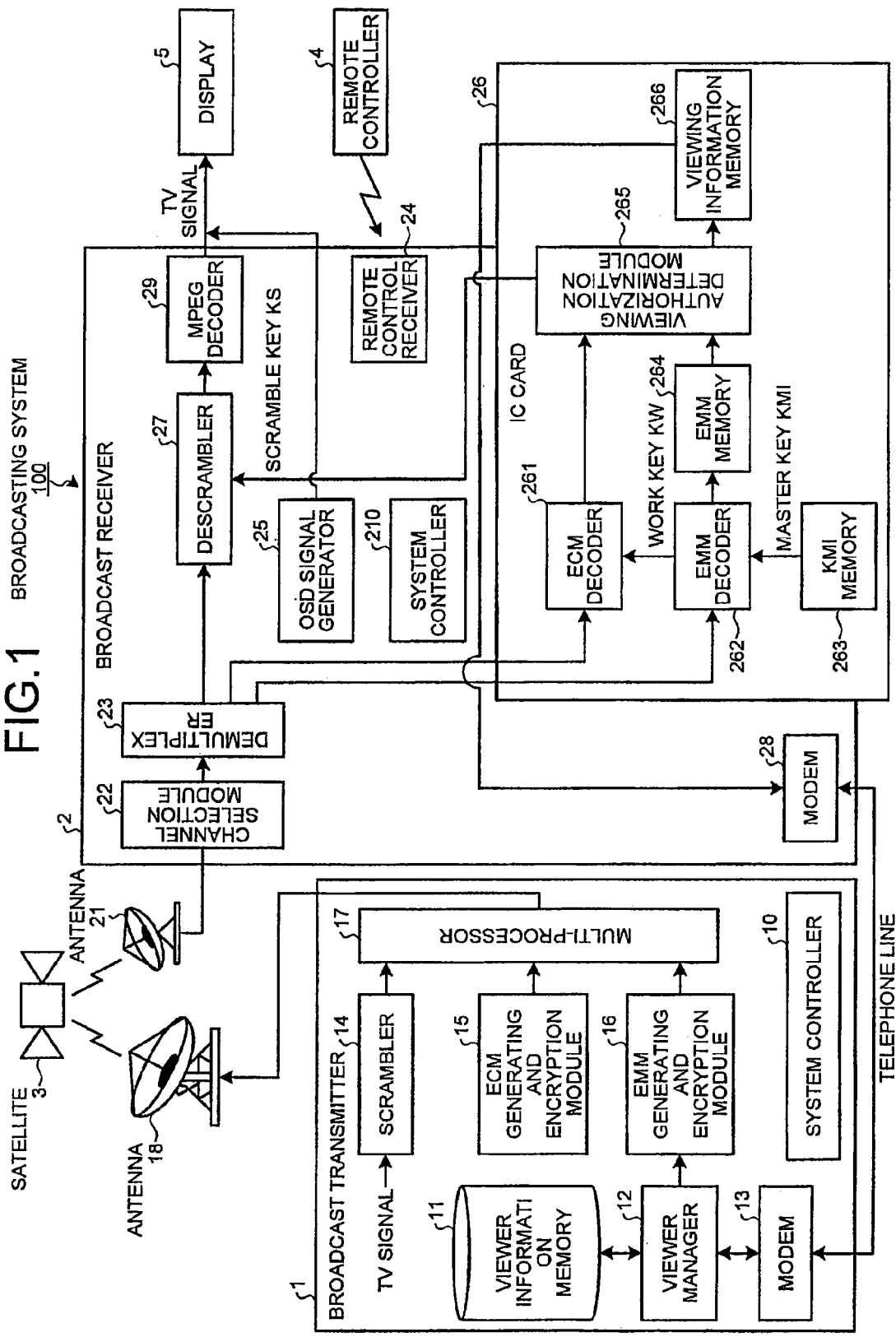

FIG.2

| ARCHITECTURE | | | | NOTES |
|---|---|---|---|---|
| ECM SECTION | ECM SECTION HEADER | | | 8 BYTE |
| | ECM PAYLOAD | FIXED PART | PROTOCOL NUMBER | 1 BYTE |
| | | | BUSINESS ENTITY IDENTIFIER | 1 BYTE |
| | | | WORK KEY IDENTIFIER | 1 BYTE |
| | | | SCRAMBLING KEY (ODD) | 8 BYTE |
| | | | SCRAMBLING KEY (EVEN) | 8 BYTE |
| | | | PROGRAM TYPE | 1 BYTE |
| | | | DATE AND TIME (DATE MJD+TIME BCD) | 5 BYTE |
| | | | RECORDING CONTROL | 1 BYTE |
| | | VARIABLE PART | | CAPABLE OF ACCOMMODATING VARIOUS FUNCTION INFORMATION |
| | | MAC | | 4 BYTE |
| | SECTION CRC | | | 4 BYTE |

FIG.3

| ARCHITECTURE | | | | NOTES |
|---|---|---|---|---|
| EMM SECTION | | EMM SECTION HEADER | | 8 BYTE |
| | EMM PAYLOAD 1 | (FIXED PART) | CARD ID | 6 BYTE |
| | | | ASSOCIATED INFORMATION BYTE LENGTH | 1 BYTE |
| | | | PROTOCOL NUMBER | 1 BYTE |
| | | | (BUSINESS ENTITY IDENTIFIER) | 1 BYTE |
| | | | (UPDATE NUMBER) | 2 BYTE |
| | | | FIRST EXPIRATION DATE | 2 BYTE |
| | | | SECOND EXPIRATION DATE | 2 BYTE |
| | | (VARIABLE PART) | | CAPABLE OF ACCOMMODATING VARIOUS FUNCTION INFORMATION |
| | | DETECTION OF MANIPULATION | | 4 BYTE |
| | PAYLOAD 2 | (SAME AS ABOVE) | | |
| | PAYLOAD 3 | (SAME AS ABOVE) | | |
| | ⋮ | ⋮ | | |
| | PAYLOAD n | (SAME AS ABOVE) | | |
| | SECTION CRC | | | 4 BYTE |

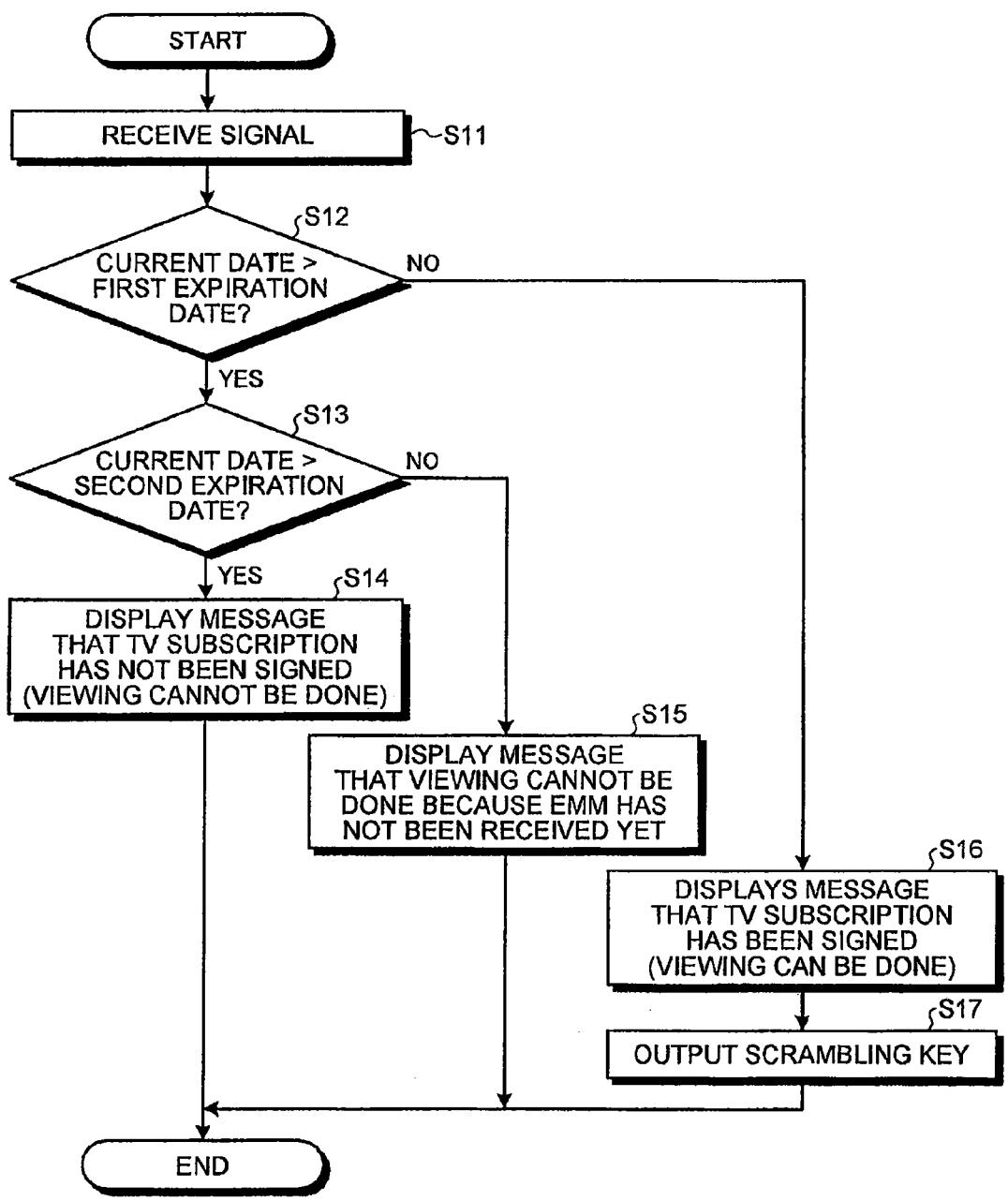

FIG.6

| RECEIVE ECM | ECM | A102 | 9000 | NON-OPERATIONAL CARD | NON-OPERATIONAL PROTOCOL NUMBER |
|---|---|---|---|---|---|
| | | A103 | | NO CONTRACT | NO KW |
| | | 8901<br>8501<br>8301 | | NO CONTRACT:<br>OUTSIDE CONTRACT | TIER<br>PREPAID PPV<br>PAYMENT-DEFERRED PPV |
| | | 8902<br>8502<br>8302 | | NO CONTRACT:<br>EXPIRED | TIER<br>PREPAID PPV<br>PAYMENT-DEFERRED PPV |
| | | XXXX<br>YYYY<br>ZZZZ | | NO CONTRACT:<br>NOT RECEIVED EMM YET | TIER<br>PREPAID PPV<br>PAYMENT-DEFERRED PPV |
| | | 8903<br>8503<br>8303 | | NO CONTRACT:<br>VIEWING RESTRICTION | TIER<br>PREPAID PPV<br>PAYMENT-DEFERRED PPV |
| | | 0800<br>0400<br>0200 | | PURCHASED:<br>VIEWING | TIER<br>PREPAID PPV<br>PAYMENT-DEFERRED PPV |
| | | 4480<br>4280 | | AVAILABLE FOR PURCHASE:<br>PREVIEWING | PREPAID PPV<br>PAYMENT-DEFERRED PPV |
| | | 8500<br>8300 | | AVAILABLE FOR PURCHASE:<br>OUTSIDE PREVIEW | PREPAID PPV<br>PAYMENT-DEFERRED PPV |
| | | 8108<br>8109<br>850F | | PURCHASE REFUSED | PURCHASE PROHIBITED PERIOD<br>VIEWING HISTORY MEMORY FULL<br>INSUFFICIENT PREPAID BALANCE |
| | | A106 | | SECURITY ERROR | ECM TAMPERING ERROR |

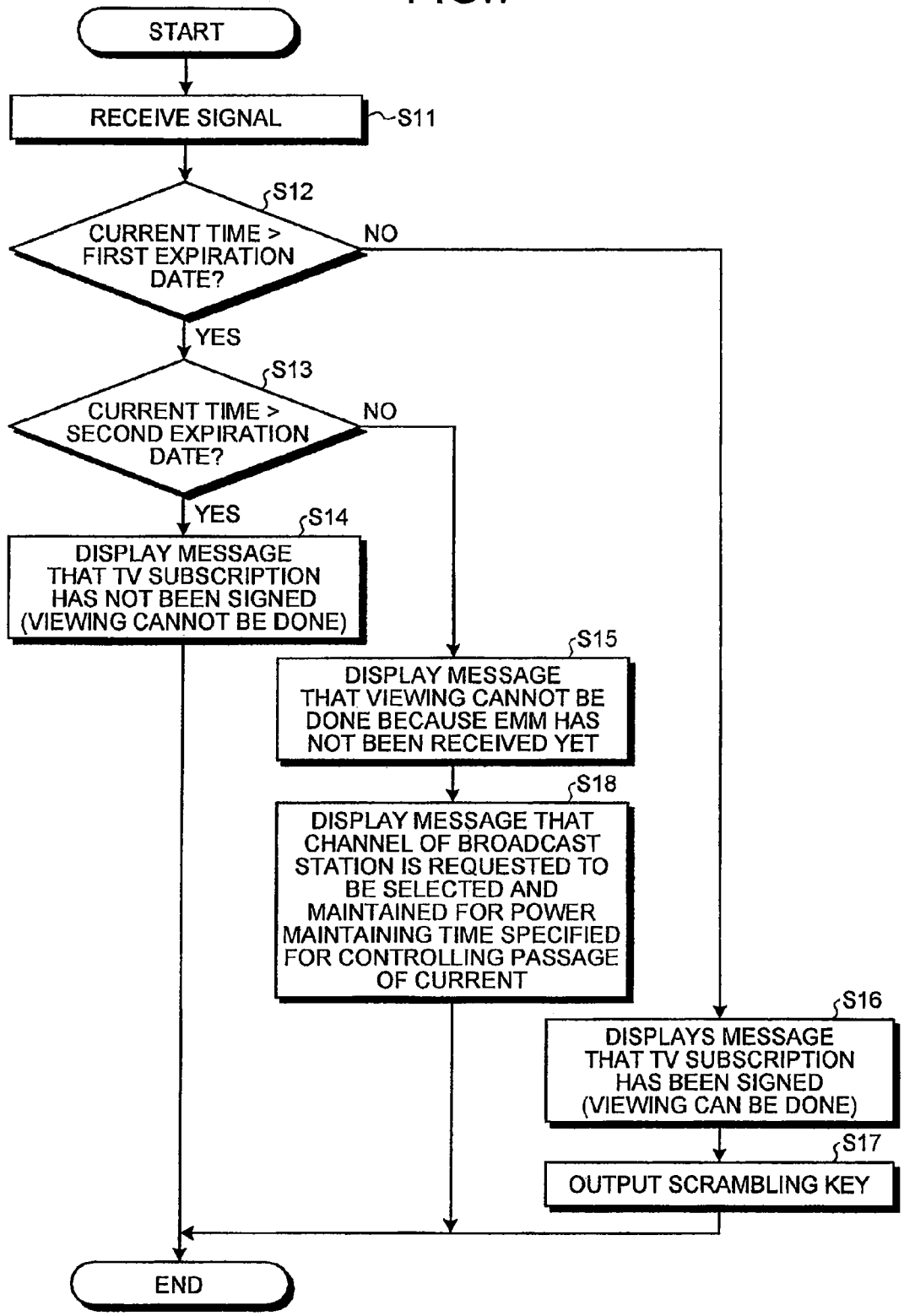

FIG.8

| OFFSET | FIELD | DATA | LENGTH [BYTES] | VALUE [HEX] |
|---|---|---|---|---|
| +3 | DATA | PROTOCOL UNIT NUMBER | 1 | 00 |
| 4 | | UNIT LENGTH | 1 | |
| 5 | | IC CARD INSTRUCTION | 2 | |
| 7 | | RETURN CODE | 2 | |
| 9 | | POWER-ON CONTROL INFO. NO. | 1 | *1) |
| 10 | | FINAL POWER-ON CONTROL INFO. NO. | 1 | *1) |
| 11 | | BUSINESS ENTITY IDENTIFIER | 1 | |
| 12 | | POWER-ON START REFERENCE DATE | 2 | *2) |
| 14 | | POWER-ON START DATE OFFSET | 1 | *3) |
| 15 | | POWER-ON PERIOD | 1 | *4) |
| | | FIRST POWER MAINTAINING TIME | | |
| 16 | | SECOND POWER MAINTAINING TIME | 1 | *5) |
| 17 | | RECEIVE NETWORK | 2 | *6) |
| 19 | | RECEIVE TS | 2 | *7) |
| 21 | SW1 | | 1 | |
| 22 | SW2 | | 1 | |

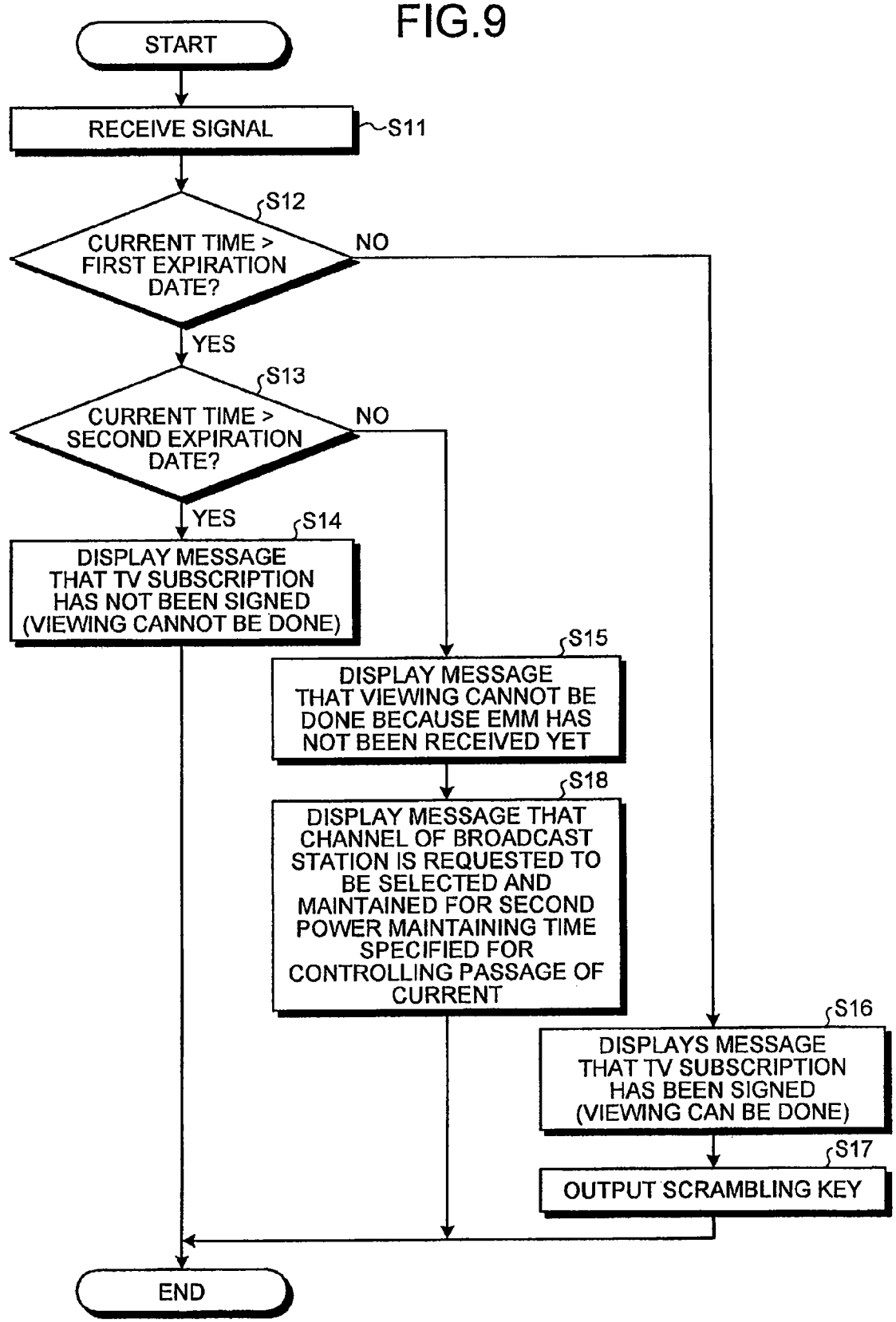

BROADCAST TRANSMITTER, A BROADCAST TRANSMITTING METHOD AND A BROADCAST RECEIVING METHOD

CROSS-REFERENCE TO RELATED APPLICATIONS

This application is a continuation of U.S. patent application Ser. No. 13/044,354, filed Mar. 9, 2011, now abandoned which is based upon and claims the benefit of priority from Japanese Patent Application No. 2010-109235, filed May 11, 2010, the entire contents of which are incorporated herein by reference.

FIELD

Embodiments described herein relate generally to a broadcast transmitter, a broadcast receiving method, and a broadcast transmitting method.

BACKGROUND

Conventionally, in digital broadcasting data transmitted from a broadcast station, a conditional access system is often used in which a program (content) to be broadcasted is scrambled and a scrambling key used to descramble the scrambled content is given only to a viewer who signs up for a TV subscription (contract). In the conditional access system, the broadcast station side sends the EMM (Entitlement Management Message) that is an individual information including information of an expiration date for viewing, for example, to each viewer who signs up for the TV subscription. In the viewer side, by obtaining the scrambling key to descramble the scrambled program based on the received EMM, it is possible to view the program scrambled in the conditional access system.

Because the EMM has the expiration date, an EMM including a new expiration date is transmitted to the viewer who continues the TV subscription before the old expiration date is expired. However, if the EMM is not received by the viewer side before the expiration date for any reason such that the viewer did not use a receiver in days while a main power source of the receiver is turned off, for example, the viewer may not be able to view the program which is continued to be subscribed. In such a case, an error message such that a TV subscription has not been subscribed is displayed by the reciever. For example, a rule of 4.18 error notification screen, chapter 4, Required Specifications of Receiver of the ARIB (Association of Radio Industries and Businesses) in TR-B15 Ver. 4.6 (ARIB TECHNICAL REPORT, OPERATIONAL GUIDELINES FOR DIGITAL SATELLITE BROADCASTING) defines as follows.
Example 5: Non-contractual (expired)
The subscription has been expired.
Please contact to the customer center of the channel you are watching.
Code: ****
In this case, a lot of efforts is required for the viewer to ask the broadcast station to retransmit the EMM and for the broadcast station to make as setting for retransmit the EMM, for example. Not only that, but because the viewer sees the error message such as that in the example, it causes the viewer who seeks to continue the TV subscription discomfort.

BRIEF DESCRIPTION OF THE SEVERAL VIEWS OF THE DRAWINGS

FIG. 1 is an exemplary block diagram of a broadcasting system according to an embodiment;
FIG. 2 is an exemplary structure diagram of an ECM section system in the embodiment;
FIG. 3 is an exemplary structure diagram of an EMM section system in the embodiment;
FIG. 5 is an exemplary flow chart of one example of operations of a broadcast receiver in the embodiment;
FIG. 6 is an exemplary structure diagram of return codes by command of an IC card in the embodiment;
FIG. 7 is an exemplary flow chart of operations of the broadcast receiver in a first modified example of the embodiment;
FIG. 8 is an exemplary structure diagram in which the number of kinds of power maintaining time is increased to two in a second modified embodiment of the embodiment;
and
FIG. 9 is an exemplary flow chart of operations of the broadcast receiver in the second modified example of the embodiment.

DETAILED DESCRIPTION

Figure 4:
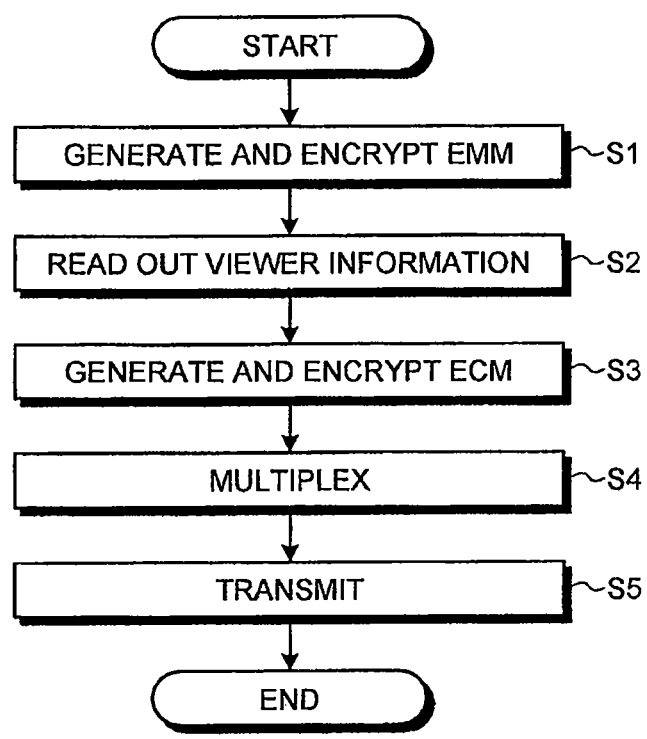
FIG. 4 is an exemplary flow chart of one example of operations of a broadcast transmitter in the embodiment.

In general, according to one embodiment, a broadcast transmitter comprises: a viewer information memory, a generator, and a transmitter. The viewer information memory is configured to store viewer information regarding a viewer who signs up for a subscription. The generator is configured to generate individual information regarding a conditional access to a content for each the viewer who signs up for the subscription based on the viewer information, the individual information comprising a first expiration date indicating an expiration date of the individual information and a second expiration date set independently of the first expiration date. The transmitter is configured to transmit a broadcast signal including the generated individual information.

According to another embodiment of the invention, a broadcast transmitting method comprises: generating, by a generator, based on viewer information regarding a viewer who signs up for a subscription stored in a memory, individual information regarding a conditional access to a content including a first expiration date indicating an expiration date of the individual information and a second expiration time set independently of the first expiration time for each the viewer who signs up for the subscription; and transmitting, by a transmitter, a broadcast signal including the generated individual information.

According to still another embodiment of the invention, a broadcast receiving method comprises: reading, by a determination module, a first expiration time indicating an expiration time of individual information and a second expiration time set independently of the first expiration time included in the individual information addressed to an apparatus including the determination module regarding a conditional access of a content stored in an individual information memory, the individual information being obtained by demultiplexing a received signal; comparing, by the determination module, the first expiration time, the second expiration time, and a current time; determining, by the determination module, whether a content can be viewed based on the comparison result; and displaying, by a display, a message indicating whether the content can be viewed based on the determination result.

In one embodiment, broadcasting system including a broadcast transmitter will now be explained in detail with reference to the drawings.

FIG. 1 is an exemplary block diagram of a broadcasting system according to an embodiment. As illustrated in FIG. 1, the broadcasting system 100 comprises a broadcast transmitter 1, a broadcast receiver 2, and a satellite 3. In FIG. 1, one example of a satellite broadcasting system is illustrated, but it is not limited to the satellite broadcasting system, and instead of this, other broadcasting system such as a terrestrial broadcasting system, and a cable broadcasting system can be also applied.

The broadcast transmitter 1 is provided in a broadcast station, for example, and configured to transmit a broadcast signal of a pay broadcast. In the broadcasting system 100, a video signal and an audio signal and so on constituting a program (contents) to be broadcasted are encoded according to the moving picture experts group (MPEG) standard, for example, and a transport stream (the broadcast signal) of the program is supplied as a TV signal to a scrambler 19 of the broadcast transmitter 1. The broadcast transmitter 1 scrambles (encrypts) the program of the pay broadcast. The scrambler 14 scrambles the input TV SIGNAL by using a predetermined scrambling key to output to a multiplexer 17.

Regarding the pay broadcast, if a viewer signs up for a TV subscription (contract) with the broadcast station, the viewer can receive a signal of a pay broadcast program and watch the pay broadcast program. At a reception side, if a program is determined to be able to be viewed according to terms of the subscription and so on, the pay program is descrambled by using the scrambling key to be viewed. It can be determined whether a program can be viewed by using an IC card described later.

For example, in a receiver receiving a broadcast signal sent by using the communication satellite (CS) and the broadcasting satellite (BS) in Japan, it is determined whether a program can be viewed by using the IC card. The IC card stores a card ID for identifying a card, and a unique master key for each card. As described later, the IC card is a microcomputer device, and stores information regarding the terms of the subscription and so on in a nonvolatile memory of the microcomputer device, and determines whether a program can be viewed based on information of the program and the information regarding the terms of the subscription and so on when the program is received.

For the determination of whether a program can be viewed, an entitlement control message (ECM) and an entitlement management message (EMM) are used. The ECM is defined in the ARIB STD-B25 Ver. 5.1 as a standard of a conditional access system for digital broadcasting formulated by the Association of Radio Industries and Businesses (hereinafter referred to as standard) (Table 3-1 ECM Section Structure, (1) ECM section structure, 3.2.3.2 ECM Details, 3.2.3 ECM, 3.2 Associated Information Subsystem, Chapter 3 Technical Specifications for Scrambling and Associated Information). FIG. 2 is an exemplary structure diagram of an ECM section system in the embodiment. As illustrated in FIG. 2, according to the standard, the ECM is composed of a fixed part which is always transmitted fixedly, and a variable part of which content is different depending on its purpose. In the fixed part of the ECM, a protocol number, a business entity identifier, a work key identifier, scrambling keys used when a program is scrambled, a program type, a date and time, and a Recording control are arranged. In the variable part of the ECM, function information regarding tier (flat-rate pricing) determination, function information regarding pay-as-you-go (PPV: pay-per-view) determination, and function information regarding deletion are arranged. That is to say, information used to specify a program and information indicating whether a recording can be allowed and so on are transmitted by the ECM.

The EMM, which is individual information of the conditional access system is also defined in the standard (Table 3-2 EMM Section Structure, (1) EMM section structure, 3.2.4.2 EMM Details, 3.2.4 EMMs, 3.2 Associated Information Subsystem, Chapter 3 Technical Specifications for Scrambling and Associated Information). According to the standard, the EMM is composed of a fixed part which is always transmitted fixedly, and a variable part of which content is different depending on its purpose. In the variable part of the ECM, a variety of function information, that is to say, function information regarding a work key, function information regarding tier, function information regarding future PPV, function information regarding current control, function information regarding entire control, and function information regarding compulsory call are arranged. In the fixed part of the EMM, a card ID, an associated information byte length, the protocol number, a pay business entity identifier, an update number, and information of an expiration date indicating an end of a contract are arranged. Parts other than the card ID of the EMM are encrypted as described later.

Thus, at a side of the viewer, the EMM addressed to the viewer (the EMM including the card ID of the viewer) is received, and the work key is obtained from the EMM, and the scrambling key is obtained from the ECM to descramble the TV signal, and thereby, the program can be viewed. The broadcast station transmits the EMM including the card ID of the IC card of the viewer who signs up for the TV subscription with the broadcast station to the viewer periodically to update the EMM of the viewer. That is to say, by updating the EMM periodically, the work key is updated, and the expiration date indicating the end of the contract is extended to prevent unauthorized viewing. The broadcast station does not transmit the EMM periodically to the viewer who does not sign up for the TV subscription and the viewer who does not update the TV subscription. Thus, the broadcast station limits the viewing of a broadcasted program based on the TV subscription for which the viewer signs up with the broadcast station. The update of the work key depends on the operation of the broadcast station, and can be updated in a same period as that of when the expiration date indicating the end of the contract is extended, and can be switched in a longer period or a shorter period, and the EMM is transmitted in each casein accordance with the operation of each broadcast station. That is to say, as the content of the EMM, the update of the work key and the extension of the expiration date indicating the end of the contract can be done at a same time, or only one of both the update of the work key and the extension of the expiration date indicating the end of the contract can be done.

FIG. 3 is an exemplary structure diagram of an EMM section system in the embodiment. As illustrated in FIG. 3, in the fixed part of the EMM, in addition to a first expiration date indicating an expiration date of the EMM, a second expiration date for displaying a message indicating that viewing cannot be done because the EMM has not been received yet is arranged. The second expiration date is an expiration date preset independently of the first expiration date, and can be a date and time after a date and time of the first expiration date such as a last day of a period for transmitting a new EMM for update. As second expiration date, a date can be directly specified, or can be specified as a difference between the first expiration date and the second expiration date can be specified. For example, in the case that the date is specified as the difference, the number of dates from the first expiration date, and so on can be specified. In a case of the viewer who does not update the TV subscription after the first expiration date, the first expiration date and the second expiration date can be the same with each other.

For example, in the embodiment, the expiration date is six months, and the EMM is transmitted from a week to a month and so on before the expiration date, and the EMM is updated twice a year. In this case, the broadcast transmitter 1 of the broadcast station transmits the EMM from a week to a month and so on before the first expiration time until the second expiration time. If the second expiration time is one month after the first expiration time, the transmission of the EMM for update begins from a week to a month and so on before the first expiration time, and ends one month after the first expiration time.

As described before, by transmitting the EMM periodically, even if the EMM transmitted periodically cannot be received because, for example, a power source of the broadcast receiver 2 is not turned on during the transmission period of the EMM until the first expiration date, it is possible to update the EMM because, for example, the power source of the broadcast receiver 2 is turned on by the second expiration date, and the broadcast from the broadcast transmitter 1 can be received. Compared to the case in which the EMM is transmitted from a week to a month and so on before the first expiration date until the first expiration date, it is possible to reduce efforts for the viewer who has been failed to receive the EMM for update to ask the broadcast station to request the transmission of the EMM, for example, and efforts for the broadcast station to transmit the EMM again. Also, even if the viewer has not been able to receive the EMM for the period until the first expiration date, it is possible for the viewer to see an improved error display for the period until the second expiration date.

Referring back to FIG. 1, the explanation of the broadcasting system 100 is continued. The broadcast transmitter 1 includes a system controller 10, a viewer information memory 11, a viewer manager 12, a modem 13, the scrambler 14, an ECM generating and encryption module 15, an EMM generating and encryption module 16, and a multiplexer 17. The system controller 10 comprises a central processing unit (CPU), a read only memory (ROM), and a random access memory (RAM) not illustrated. The CPU develops a program stored in the ROM to a work area of the RAM to execute the program sequentially in order to control operations of the broadcast transmitter 1 integratedly.

The viewer information memory 11 as the viewer information memory module is a nonvolatile memory which stores viewer information in which a relation between the viewer who signs up for the TV subscription and the ID (corresponds to the card ID described later), and a relation between the ID and a master key Km, conditions of the TV subscription (contents of the subscription including the date of the subscription and so on), and the expiration date of the EMM of when the EMM is previously updated and so on are described. The viewer manager 12 reads out the viewer information stored in the viewer information memory 11 and updates the viewer information under control of the system controller 10. The modem 13 performs data communicates with the broadcast receiver 2 through a communication line such as a telephone line. By the data communication by the modem 13, in the broadcasting system 100, PPV program services including purchasing and billing are provided.

The ECM generating and encryption module 15 generates the ECM for each program. As described before, the ECM includes the scrambling key, and the ECM generating and encryption module 15 encrypts the generated ECM with the work key to output to the multiplexer 17. Therefore, at the reception side, the ECM is decoded with the work key to obtain the scrambling key. The broadcast transmitter 1 changes the work key accordingly because the TV subscription is changed and unauthorized viewing has to be prevented. Therefore, the broadcast transmitter 1 multiplexes the work key to transmit. Specifically, the variable part of the EMM that information regarding the work key is arranged is transmitted.

The EMM generating and encryption module 16 generates the EMM. The EMM generating and encryption module 16 generates the EMM for each address (each viewer) according to the TV subscription read by the viewer manager 12 from the viewer information memory 11. Specifically, the EMM generating and encryption module 16 arranges the card ID unencrypted in the fixed part of the EMM based on the read TV subscription so that the EMM for the reception side can be identified at the reception side. The card ID is provided to the broadcast station side in the TV subscription to be stored in the viewer information memory 11 of the broadcast transmitter 1. That is to say, when the viewer signs up for the TV subscription with the broadcast station, information regarding an IC card 26 inserted into the broadcast receiver 2 by the viewer is provided to the broadcast station side to be stored in the viewer information memory 11 of the broadcast transmitter 1.

The EMM generating and encryption module 16 generates the fixed part of the EMM and the variable part of the EMM including the work key and the terms of the subscription, and encrypts the fixed part of the EMM and the variable part of the EMM except the card ID with the master key. The EMM from the EMM generating and encryption module 16 is supplied to the multiplexer 17.

The multiplexer 17 multiplexes an output of the scrambler 14, an output of the ECM generating and encryption module 15, and an output of the EMM generating and encryption module 16, and includes the ECM and EMM in the broadcast signal to transmit from an antenna 18 to the satellite 3. The broadcast signal from the antenna 18 is broadcasted from the satellite 3 to each the broadcast receiver 2.

The broadcast receiver 2 includes a system controller 210, a channel selection module 22, a demultiplexer 23, a remote control receiver 24, an OSD signal generator 25, the IC card 26, a descrambler 27, a modem 28, and an MPEG decoder 29. The system controller 210 includes a CPU, a ROM, a RAM, and a nonvolatile memory (not illustrated), and the CPU develops a program stored in the ROM to a work area of the RAM to execute the program sequentially in order to control operations of the broadcast receiver 2 integratedly.

The channel selection module 22 performs a channel selection of the broadcast signal received by an antenna 21 under control of the system controller 210. The demultiplexer 23 demultiplexes the signal multiplexed in the broadcast station side. Specifically, the demultiplexer 23 demultiplexes the signal into the TV signal, the ECM, the EMM and so on. The TV signal obtained by demultiplexing is output to the descrambler 27. The ECM obtained by demultiplexing is output to an ECM decoder 261 of the IC card 26. The EMM obtained by demultiplexing is output to an EMM decoder 262 of the IC card 26.

The remote control receiver 24 receives an operation signal, which is an wireless signal, or an infrared signal, for example, output from a remote controller 4 according to a user's operation and so on. The received operation signal is output to the system controller 210. The system controller 210 controls a channel selection in the channel selection module 22, and so on based on the operation signal.

The OSD signal generator 25 generates an on-screen display (OSD) signal under control of the system controller 210. The OSD signal generated in the OSD signal generator 25 is superimposed on the TV signal output to a display 5 such as a liquid crystal display (LCD) and a plasma display by the MPEG decoder 29. Thus the OSD signal is superimposed on the TV signal so that a message is displayed on the display 5.

The IC card 26 is a microcomputer device in which a unique card ID is preset in a nonvolatile memory and so on. The IC card 26 includes the ECM decoder 261, the EMM decoder 262, a Kmi memory 263, an EMM memory 264, a viewing authorization determination module 265, a viewing information memory 266.

The ECM decoder 261 decodes the ECM from the demultiplexer 23 with the work key Kw from the EMM decoder 262. The decoded ECM is output to the viewing authorization determination module 265.

The EMM decoder 262 compares the card ID preset in the IC card 26 with the EMM from the demultiplexer 23 to identify the EMM addressed to the IC card 26. Next, the EMM decoder 262 decodes the identified EMM with the master key Kmi from the Kmi memory 263. The Kmi memory 263 is a nonvolatile memory to store the master key Kmi for the IC card 26.

The EMM memory 264 as an individual information memory is a rewritable nonvolatile memory, and stores the EMM decoded by the EMM decoder 262. As described before, because the EMM is updated periodically by the broadcast station, the EMM memory 264 continues to store the EMM until the EMM is updated. The EMM memory 264 supplies the stored EMM to the EMM decoder 262 and the viewing authorization determination module 265. The EMM decoder 262 outputs the work key Kw included in the EMM stored in the EMM memory 264 to the ECM decoder 261.

The viewing authorization determination module 265 determines whether a program can be viewed based on the decoded ECM and the EMM stored in the EMM memory 264. Specifically, the viewing authorization determination module 265 compares a date and time (current time) included in the ECM with the first expiration date and the second expiration date included in the EMM, and determines that the program can be viewed if the current time is before the first expiration date. If the current time is after the first expiration date, the viewing authorization determination module 265 determines that the program cannot be viewed. For more detail, if the current time is after the first expiration date and before the second expiration date, the viewing authorization determination module 265 determines that the program cannot be viewed because the EMM has not been received yet. If the current time is after the second expiration date, the viewing authorization determination module 265 determines that the TV subscription is not signed and the EMM expires. The determination result is output to the system controller 210 as return code by command described later. If the viewing authorization determination module 265 determined that the program can be viewed, the viewing authorization determination module 265 outputs the scrambling key Ks to the descrambler 27.

The viewing information memory 266 stores information for specifying a PPV program which the viewer has decided to purchase (viewing information). The broadcast transmitter 1 is notified of the viewing information stored in the viewing information memory 266 by data communication via a communication line such as a telephone line connected to the modem 28. The broadcast transmitter 1 stores the viewing information into the viewer information memory 11 though the viewer manager 12 to use for collecting a viewing fee, and so on.

The descrambler 27 receives the scrambling key Ks from the IC card 26, and descrambles the TV signal input from the demultiplexer 23 to output to the MPEG decoder 29. The MPEG decoder 29 decodes the input signal, and the decoded TV signal (the video signal and audio signal of the program) to the display 5.

One example of operations of the broadcast transmitter 1 is explained. FIG. 4 is an exemplary flow chart of one example of operations of the broadcast transmitter 1. As illustrated in FIG. 4, the broadcast transmitter 1 generates program information (ECM) including information related to the scrambling key used when a program is scrambled by the scrambler 14 and viewing conditions of a program in the ECM generating and encryption module 15 (S1).

Next, in the broadcast transmitter 1, the viewer manager 12 reads out the viewer information stored in the viewer information memory 11 to output to the EMM generating and encryption module 16 (S2). After that, the EMM generating and encryption module 16 generates individual information (EMM) including an expiration time that a program can be viewed by each viewer, a channel and a type of program that can be viewed by each viewer, and the work key used to decode the ECM, for each ID stored in the viewer information memory 11 (S3). The EMM is generated for the ID within the transmission period of the EMM (from one week to one month and so on before the first expiration date of the EMM previously transmitted to the second expiration date). The generated EMM includes the first expiration date and the second expiration date in the example described before.

Next, the multiplexer 17 multiplexes the TV signal from the scrambler 14, the ECM generated by the ECM generating and encryption module 15, and the EMM generated by the EMM generating and encryption module 16 (S4). The signal obtained by being multiplexed by the multiplexer 17 is transmitted from the antenna 18 (S5).

One example of the broadcast receiver 2 is explained. FIG. 5 is an exemplary flow chart of one example of operations of the broadcast receiver 2. As illustrated in FIG. 5, the broadcast receiver 2 receives the signal transmitted from the broadcast transmitter 1 (S11). Specifically, in the broadcast transmitter 1, the demultiplexer 23 demultiplexes the TV signal, the ECM, and the EMM which are multiplexed from the signal channel-selected by the channel selection module 22.

Next, the viewing authorization determination module 265 of the IC card 26 compares the date and time (the current time) included in the ECM obtained by being demultiplexed with the first expiration date and the second expiration date included in the EMM stored in the EMM memory 264 to determine whether the viewing is authorized (S12, S13). Specifically, the viewing authorization determination module 265 determines whether the current time is after the first expiration date (the current time>the first expiration date) (S12), and if the current time is after the first expiration date (Yes at S12), determines whether the current time is after the second expiration date (the current time>the second expiration date) (S13).

That is to say, the viewing authorization determination module 265 determines whether the current time is before the first expiration date (No at S12), the current time is after the first expiration date and before the second expiration date (No at S13), or the current time is after the second expiration date (Yes at S13). The determination result is output as the return code by command to the system controller 210.

FIG. 6 is an exemplary structure diagram of the return codes by command of the IC card 26 in the embodiment, and is obtained by improving return codes related to ECM reception of (2) Return codes by command (Table 4-58 Return Codes (1) and SW1/SW2 Parameters by Command (HEX)), 4.3.3.5 Return Codes, 4.3 CA Interface, Chapter 4 Receiver Technical Specifications of the standard. As illustrated in FIG. 6, if the current time is before the first expiration time, because the EMM is valid, the return codes indicating that the viewing can be done, "0800", "0400", "0200", and so on are output. If the current time is after the first expiration time and is before the second expiration time, the return codes indicating that the viewing cannot be done because the EMM has not been received, "XXXX", "YYYY", "ZZZZ", and so on are output. If the current time is after the second expiration date, the return codes indicating that the viewing cannot be done because the TV subscription has not been signed and the EMM is not updated, "8902", "8502", "8302", and so on are output.

Next, if the current time is after the second expiration date according to the return code by command output from the IC card 26 (Yes at S13), the system controller 210 controls the OSD signal generator 25 to superimpose a message that the viewing cannot be done because the TV subscription has not been signed on the TV signal to display on the display 5 (S14). If the current time is after the first expiration date and is before the second expiration date (No at S13), the system controller 210 displays the message that the viewing cannot be done because the EMM has not been received yet on the display 5 (S15). If the current time is before the first expiration date (No at S12), the system controller 210 displays a message that the TV subscription has been signed (the viewing can be done) on the display 5 (S16), and the scrambling key Ks is output from the viewing authorization determination module 265 (S17), and the signal obtained by demultiplexing in the demultiplexer 23 is descrambled.

By the processing described before, in the broadcast receiver 2, if the current time is before the first expiration date, the message that the TV subscription has been signed (the viewing can be done) is displayed on the display 5, and it is possible to view the program. If the current time is after the first expiration date and before the second expiration date, the message that the viewing cannot be done because the EMM has not been received yet is displayed on the display 5, and it is possible to urge the user to update the EMM. If the current time is after the second expiration date, the message that the viewing cannot be done because the TV subscription has not been signed is displayed on the display 5, and it is possible to urge the user to sign up for the TV subscription. As just described, if the current time is after the first expiration date and before the second expiration date, a different message is output from a message output when the current time is after the second expiration date. Therefore, it is possible to indicate an appropriate response for the user to be taken to view the program. In addition to this, it is possible to cause the viewer who seeks to continue the TV subscription less discomfort because the message which indicates that the viewing cannot be done because the EMM has not been received yet and which urges the user to update the EMM and which is different from the conventional message as an error display of the receiver that the TV subscription is not signed is displayed on the display 5. Also, it is possible to display the conventional message that the TV subscription is not signed is displayed after the second expiration time for the viewer who does not continue the TV subscription, and to display the conventional message that the TV subscription is not signed is displayed after a predetermined period between the second expiration time and the expiration time of the TV subscription has elapsed from the expiration time of the TV subscription without sending a new EMM to the viewer who does not continue the TV subscription from the broadcast station.

Next, a first modified example of the embodiment described before is explained with reference to FIG. 7. FIG. 7 is an exemplary flow chart of the first modified example of operations of the broadcast receiver 2. As illustrated in FIG. 7, in the first modified example, if the current time is after the first expiration date and is before the second expiration date (No at S13) and the viewing cannot be done because the EMM has not been received yet, a message that the channel of the broadcast station is requested to be selected and maintained for a power maintaining time specified by the broadcast station side for controlling the passage of current is displayed on the display 5 (S18).

As described before, the EMM transmitted from the broadcast station side includes function information related to the power on control. In a standby state by a sub-power source being turned off, for example, the power maintaining time for passing a current through a part of circuits to receive the EMM is set in the function information related to the power on control. Because the number of the viewers who have signed up for the TV subscription with the broadcast station is large, the EMM addressed to a single one of the viewers is transmitted in a period of a predetermined time, for example, 30 minutes. As a passing current time to receive the EMM transmitted periodically, the power maintaining time is set.

If the viewing cannot be done because the EMM has not been received yet, the broadcast receiver 2 of the system controller 210 controls the OSD signal generator 25 to interpose the message that the channel of the broadcast station is requested to be selected and maintained for the power maintaining time specified by the broadcast station side for controlling the passage of current (for example, do not turn off a main power source to stop all of the passage of current) on the TV signal to display on the display 5 (S18). Therefore, a user can recognize a way to receive the EMM when the viewing cannot be done because the EMM has not been received yet. For example, the user can recognize the following. The user can recognize that if the channel continues to be received as it is and at least the power maintaining time elapses, the EMM can be received and the viewing can be done. The user can recognize that instead of this, if it is in the standby state (for example, the sub power source is turned off) and at least the power maintaining time elapses, the EMM can be received and the viewing can be done by the power on control. This is limited to a receiver which has the power on control function. That is to say, the user can recognize how long it takes at a maximum for updating the EMM so that the viewing can be done.

Next, a second modified example of the embodiment described before is explained with reference to FIGS. 8 and 9. FIG. 8 is an exemplary structure diagram in which the number of kinds of the power maintaining time for the power on control transmitted from the broadcast transmitter 1 to the broadcast receiver 2 is increased from one in the conventional technique to two in the second modified embodiment, and is obtained by improving (20) Power-on Control Information Request command, (Table 4-48 Power-on Control Information Request Response) 4.3.3.3 Command/Response Details, 4.3 CA Interface, Chapter 4 Receiver Technical Specifications of the standard and the EMM to send the power on control information which responds to the Power-on Control Information Request command. As described in the EMM details, 3.2.4.2 of the standard, the power on control information is arranged in the variable part of the EMM, but details of the power on control descriptor are undocumented. Therefore, the second modified example is explained based on a form of the (20) Power-on Control Information Request command which is a rule for the receiver to obtain the power on control information from the IC card. FIG. 9 is an exemplary flow chart of the second modified example of operations of the broadcast receiver 2.

As illustrated in FIG. 8, in the second modified example, a second power maintaining time which is longer than a first power maintaining time is set, and the broadcast station side transmits the EMM including the first power maintaining time and the second power maintaining time. In the broadcast station, the period that the EMM for the first power maintaining time is transmitted to a single viewer (for example, 30 minutes) is longer than the period that the EMM for the second power maintaining time is transmitted to a single viewer (for example, 60 minutes)).

As illustrated in FIG. 9, if the current time is after the first expiration date and is before the second expiration date (No at S13) and the viewing cannot be done because the EMM has not been received yet, the broadcast receiver 2 of the system controller 210 controls the OSD signal generator 25 to impose a message that the channel of the broadcast station is requested to be selected and maintained for the second power maintaining time specified by the broadcast station side for controlling the passage of current on the TV signal to display on the display 5 (S19).

As just described, because the period that the EMM for the first power maintaining time is transmitted to a single viewer is longer than the period that the EMM for the second power maintaining time is transmitted to a single viewer, it is possible to reduce a transmission bandwidth to transmit the EMM to the single viewer that the EMM cannot be update for any reason. That is to say, it is possible to reduce an influence to the transmission bandwidth to send the EMM newly generated after the first expiration date. For example, if the first power maintaining time is set to be 30 minutes and the second power maintaining time is set to be 60 minutes, it is possible to reduce by 50% the transmission bandwidth for the EMM to be transmitted after the first expiration date by the second expiration date. In the second modified example, the transmission bandwidth for the EMM is set to be ½, but it is not limited to. The transmission bandwidth for the EMM can be determined in accordance with generation status of the receiver that cannot receive the EMM by the first expiration date.

In the embodiments (including the first and second modified examples), if the current time is before the first expiration date (No at S12), the system controller 210 displays the message that the TV subscription has been signed (the viewing can be done) on the display 5 (S16). Instead of this, if the viewing can be done, the message does not have to be displayed. Only when an operation instruction to display a status is output from the remote controller 4, the messages of S14, S15, S16, for example, can be displayed.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A broadcast receiver comprising:
at least one hardware processor that reads a first expiration time and a second expiration time from individual information stored in an individual information memory and by which conditional access to content is managed, compares the first expiration time and the second expiration time with a current time, determines whether the content can be viewed based on the comparison result, controls display of a first message if the current time is after the first expiration time and before the second expiration time based on the determination result, and controls display of a second message if the current time is after the second expiration time based on the determination result, wherein
the individual information is updated periodically during a subscription period for the content and further until the second expiration time, addressed to the broadcast receiver, and obtained by demultiplexing a received signal,
the first expiration time indicates an end of the subscription period for the content, which is an expiration time for the individual information,
the second expiration time is set independently of the first expiration time and indicates an expiration time for displaying the first message,
the first message indicates that the content cannot be viewed because the individual information has not been updated yet,
the second message indicates that the content cannot be viewed because the subscription of the content has not been signed,
the individual information addressed to the broadcast receiver includes a power maintaining time indicating a time to maintain power and a selected channel to update the individual information addressed to the broadcast receiver, and
the at least one hardware processor displays a message requesting that the selected channel be maintained for the power maintaining time if the current time is after the first expiration time and before the second expiration time.

2. A broadcast receiving method comprising:
reading a first expiration time and a second expiration time from individual information stored in an individual information memory and by which conditional access to content is managed;
comparing the first expiration time and the second expiration time with a current time;
determining whether the content can be viewed based on the comparison result; and
controlling display of a first message if the current time is after the first expiration time and before the second expiration time based on the determination result, and display of a second message if the current time is after the second expiration time based on the determination result, wherein
the individual information is updated periodically during a subscription period for the content and further until the second expiration time, addressed to the broadcast receiver, and obtained by demultiplexing a received signal,
the first expiration time indicates an end of the subscription period for the content, which is an expiration time for the individual information, the second expiration time is set independently of the first expiration time and indicates an expiration time for displaying the first message, the first message indicates that the content cannot be viewed because the individual information has not been updated yet, the second message indicates that the content cannot be viewed because the subscription of the content has not been signed, the individual information addressed to the broadcast receiver includes a power maintaining time indicating a time to maintain power and a selected channel to update the individual information addressed to the broadcast receiver, and the controlling includes controlling display of a message requesting that the selected channel be maintained for the power maintaining time if the current time is after the first expiration time and before the second expiration time.

3. A broadcast receiver comprising:

at least one hardware processor that reads a first expiration time and a second expiration time from individual information by which conditional access to content is managed, compares the first expiration time and the second expiration time with a current time, determines whether the content can be viewed based on the comparison result, and displays a first message if the current time is after the first expiration time and before the second expiration time based on the determination result, wherein the individual information is updated periodically during a subscription period for the content and further until the second expiration time, the first expiration time indicates an end of the subscription period for the content, which is an expiration time for the individual information, the second expiration time is set independently of the first expiration time and indicates an expiration time for displaying the first message, the first message indicates that the content cannot be viewed because the individual information has not been updated yet, the individual information includes a power maintaining time indicating a time to maintain power and a selected channel to update the individual information, and the at least one hardware processor controls display of a message requesting that the selected channel be maintained for the power maintaining time if the current time is after the first expiration time and before the second expiration time.

4. The broadcast receiver of claim 3, wherein the at least one hardware processor controls display of a second message if the current time is after the second expiration time, wherein the second message indicates that the content cannot be viewed because the subscription of the content has not been signed.

5. A broadcast receiving method comprising:

reading a first expiration time and a second expiration time from individual information by which conditional access to content is managed;

comparing the first expiration time and the second expiration time with a current time;

determining whether the content can be viewed based on the comparison result; and displaying a first message if the current time is after the first expiration time and before the second expiration time based on the determination result, wherein the individual information is updated periodically during a subscription period for the content and further until the second expiration time, the first expiration time indicates an end of the subscription period for the content, which is an expiration time for the individual information, the second expiration time is set independently of the first expiration time and indicates an expiration time for displaying the first message, the first message indicates that the content cannot be viewed because the individual information has not been updated yet, the individual information includes a power maintaining time indicating a time to maintain power and a selected channel to update the individual information, and the at least one hardware processor controls display of a message requesting that the selected channel be maintained for the power maintaining time if the current time is after the first expiration time and before the second expiration time.

6. The broadcast receiving method of claim 5, wherein the controlling includes controlling display of a second message if the current time is after the second expiration time, wherein the second message indicates that the content cannot be viewed because the subscription of the content has not been signed.

* * * * *